(12) United States Patent
Repenning et al.

(10) Patent No.: US 10,091,620 B2
(45) Date of Patent: Oct. 2, 2018

(54) CONFIGURABLE POINT OF INTEREST ALERTS

(71) Applicant: GOOGLE INC., Mountain View, CA (US)

(72) Inventors: Debra Lin Repenning, Riverside, CT (US); Ray Xiaohang Wang, Millburn, NJ (US); Yakov Okshtein, Far Rockaway, NY (US); Farhan Shamsi, Rego Park, NY (US); David Singleton, London (GB); Lixin Zhang, Mountain View, CA (US); Alan Newberger, San Francisco, CA (US); Chandrasekhar Thota, Saratoga, CA (US); Douglas Alexander Gresham, Kitchener (CA); Nicholas Fey, Mountain View, CA (US); Marcus Alexander Foster, West Malling (GB); Petra Cross, San Francisco, CA (US); Andres Morales, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 63 days.

(21) Appl. No.: 15/142,897

(22) Filed: Apr. 29, 2016

(65) Prior Publication Data

US 2016/0249175 A1 Aug. 25, 2016

Related U.S. Application Data

(63) Continuation of application No. 13/786,434, filed on Mar. 5, 2013, now Pat. No. 9,341,479.

(51) Int. Cl.
G06F 19/00 (2011.01)
H04W 4/02 (2018.01)
(Continued)

(52) U.S. Cl.
CPC ............ *H04W 4/027* (2013.01); *G01C 21/00* (2013.01); *G01C 21/3679* (2013.01);
(Continued)

(58) Field of Classification Search
CPC ....... G08G 1/161; G08G 1/167; G05D 1/0274
(Continued)

(56) References Cited

U.S. PATENT DOCUMENTS 6,026,375 A 2/2000 Hall et al.
6,298,125 B1 10/2001 Goldberg et al.
(Continued)

FOREIGN PATENT DOCUMENTS

CN 101479757 A 7/2009
CN 102082995 A 6/2011
(Continued)

OTHER PUBLICATIONS

Bai, "International Preliminary Report on Patentability issued in International Application No. PCT/US2014/044202", dated Jan. 7, 2016, 6 pages.
(Continued)

*Primary Examiner* — Edward Raymond
(74) *Attorney, Agent, or Firm* — Johnson, Marcou & Isaacs, LLC

(57) ABSTRACT

Receiving point of interest zones and alerts on user devices comprises communicating, by a user computing device to a remote computing device, a request for point of interest data corresponding to points of interest within a proximity of the user device; presenting the received point of interest data; identifying a particular point of interest; and outputting an alert regarding the particular point of interest. Receiving point of interest zones on user devices comprises communicating a request for point of interest data; receiving the point of interest data from the remote network device
(Continued)

wherein a size of the point of interest zone is determined based on a density of points of interest in the proximity of the user, and wherein the shape of the point of interest zone is expanded in a direction of travel and contracted in the opposite direction; and presenting the received point of interest data.

21 Claims, 4 Drawing Sheets

(51) Int. Cl.
    *G01C 21/00*         (2006.01)
    *G01C 21/36*         (2006.01)
    *H04L 29/08*         (2006.01)
    *H04W 4/021*        (2018.01)
    *H04W 4/20*         (2018.01)
(52) U.S. Cl.
    CPC .............. *H04L 67/26* (2013.01); *H04W 4/02* (2013.01); *H04W 4/021* (2013.01); *H04W 4/022* (2013.01); *H04W 4/028* (2013.01); *H04W 4/20* (2013.01); *H04W 4/206* (2013.01)
(58) Field of Classification Search
    USPC ................................ 702/150, 182–185, 188
    See application file for complete search history.

(56) References Cited

U.S. PATENT DOCUMENTS

| | | |
|---|---|---|
| 6,414,635 B1 | 7/2002 | Stewart et al. |
| 6,490,432 B1 | 12/2002 | Wegener et al. |
| 6,587,835 B1 | 7/2003 | Treyz et al. |
| 7,062,469 B2 | 6/2006 | Meyers et al. |
| 7,519,470 B2 | 4/2009 | Brasche et al. |
| 7,529,850 B2 | 5/2009 | Verma et al. |
| 7,676,369 B2 | 3/2010 | Fujimoto et al. |
| 7,865,308 B2 | 1/2011 | Athsani et al. |
| 8,019,532 B2 | 9/2011 | Sheha et al. |
| 8,229,473 B1 | 7/2012 | De La Rue |
| 8,335,524 B2 | 12/2012 | Shutter |
| 8,335,990 B2 | 12/2012 | Arrasvuori |
| 8,385,964 B2 * | 2/2013 | Haney ................. H04M 3/4228 455/404.1 |
| 8,427,308 B1 | 4/2013 | Baron, Sr. et al. |
| 8,463,280 B1 | 6/2013 | Lim et al. |
| 8,755,824 B1 | 6/2014 | Wang et al. |
| 8,798,646 B1 | 8/2014 | Wang et al. |
| 8,924,147 B2 | 12/2014 | Vellaikal et al. |
| 8,930,162 B2 | 1/2015 | Wang et al. |
| 9,049,555 B2 | 6/2015 | Wang et al. |
| 9,144,008 B2 | 9/2015 | Attar et al. |
| 9,341,479 B2 | 5/2016 | Repenning et al. |
| 2001/0001145 A1 | 5/2001 | Barnett et al. |
| 2001/0014868 A1 | 8/2001 | Herz et al. |
| 2002/0095333 A1 | 7/2002 | Jokinen et al. |
| 2002/0133424 A1 | 9/2002 | Joao |
| 2003/0004802 A1 | 1/2003 | Callegari |
| 2003/0004831 A1 | 1/2003 | Owens |
| 2003/0005056 A1 | 1/2003 | Yamamoto et al. |
| 2003/0050863 A1 | 3/2003 | Radwin |
| 2003/0220835 A1 | 11/2003 | Barnes, Jr. |
| 2004/0181461 A1 | 9/2004 | Raiyani et al. |
| 2004/0203644 A1 | 10/2004 | Anders et al. |
| 2004/0215517 A1 | 10/2004 | Chen et al. |
| 2005/0029342 A1 | 2/2005 | Sugimoto et al. |
| 2005/0144013 A1 | 6/2005 | Fujimoto et al. |
| 2005/0209921 A1 | 9/2005 | Roberts et al. |
| 2006/0011721 A1 | 1/2006 | Olsen et al. |
| 2007/0167173 A1 | 7/2007 | Halcrow et al. |
| 2007/0275736 A1 | 11/2007 | Baek et al. |
| 2007/0281690 A1 | 12/2007 | Altman et al. |
| 2008/0070588 A1 | 3/2008 | Morin |
| 2008/0076451 A1 | 3/2008 | Sheha et al. |
| 2008/0176583 A1 | 7/2008 | Brachet et al. |
| 2008/0248815 A1 | 10/2008 | Busch |
| 2008/0258960 A1 | 10/2008 | Rosenberg et al. |
| 2009/0005987 A1 | 1/2009 | Vengroff et al. |
| 2009/0012955 A1 | 1/2009 | Chu et al. |
| 2009/0047972 A1 | 2/2009 | Neeraj |
| 2009/0055094 A1 | 2/2009 | Suzuki |
| 2009/0081994 A1 | 3/2009 | Drobot et al. |
| 2009/0167553 A1 | 7/2009 | Hong et al. |
| 2009/0181695 A1 | 7/2009 | Wirola et al. |
| 2009/0259396 A1 | 10/2009 | He |
| 2009/0307096 A1 | 12/2009 | Antonellis |
| 2009/0319166 A1 | 12/2009 | Khosravy et al. |
| 2010/0017126 A1 | 1/2010 | Holcman et al. |
| 2010/0190513 A1 | 7/2010 | Andreasson |
| 2010/0253508 A1 | 10/2010 | Koen et al. |
| 2010/0322214 A1 | 12/2010 | Workman et al. |
| 2011/0028160 A1 | 2/2011 | Roeding et al. |
| 2011/0040626 A1 | 2/2011 | Lin |
| 2011/0047509 A1 | 2/2011 | Arrasvuori |
| 2011/0065423 A1 | 3/2011 | Karaoguz et al. |
| 2011/0099047 A1 | 4/2011 | Weiss et al. |
| 2011/0103360 A1 | 5/2011 | Ku et al. |
| 2011/0153143 A1 | 6/2011 | O'Neil et al. |
| 2011/0209221 A1 | 8/2011 | Hanson et al. |
| 2011/0238476 A1 | 9/2011 | Carr et al. |
| 2011/0238514 A1 | 9/2011 | Ramalingam et al. |
| 2012/0001928 A1 | 1/2012 | Sheha et al. |
| 2012/0100872 A1 | 4/2012 | Alizadeh-Shabdiz et al. |
| 2012/0108265 A1 | 5/2012 | Morin |
| 2012/0130817 A1 | 5/2012 | Bousaleh et al. |
| 2012/0140749 A1 | 6/2012 | Caldwell et al. |
| 2012/0147862 A1 | 6/2012 | Poojary et al. |
| 2012/0161958 A1 | 6/2012 | Turon et al. |
| 2012/0172019 A1 | 7/2012 | Scott et al. |
| 2012/0235812 A1 | 9/2012 | Maia et al. |
| 2012/0242511 A1 | 9/2012 | Morgan et al. |
| 2012/0270521 A1 | 10/2012 | Lopez Garcia et al. |
| 2012/0295639 A1 | 11/2012 | Fitoussi et al. |
| 2012/0310527 A1 | 12/2012 | Yariv et al. |
| 2013/0005362 A1 | 1/2013 | Borghei |
| 2013/0006515 A1 | 1/2013 | Vellaikal et al. |
| 2013/0067044 A1 | 3/2013 | Levy-Yurista et al. |
| 2013/0091452 A1 | 4/2013 | Sorden et al. |
| 2013/0103697 A1 | 4/2013 | Hill et al. |
| 2013/0155851 A1 | 6/2013 | Koodli et al. |
| 2013/0155965 A1 | 6/2013 | Koodli |
| 2013/0178233 A1 | 7/2013 | McCoy et al. |
| 2013/0179275 A1 | 7/2013 | Harb |
| 2013/0267253 A1 | 10/2013 | Case et al. |
| 2013/0290106 A1 | 10/2013 | Bradley et al. |
| 2013/0303195 A1 | 11/2013 | Bahl et al. |
| 2013/0345980 A1 | 12/2013 | van Os et al. |
| 2014/0019255 A1 | 1/2014 | Wu et al. |
| 2014/0143408 A1 | 5/2014 | Workman et al. |
| 2015/0100271 A1 | 4/2015 | Wang et al. |
| 2015/0230053 A1 | 8/2015 | Scellato et al. |
| 2015/0264527 A1 | 9/2015 | Wang et al. |
| 2017/0142550 A1 | 5/2017 | Wang et al. |
| 2018/0014155 A1 | 1/2018 | Wang et al. |

FOREIGN PATENT DOCUMENTS

| | | |
|---|---|---|
| CN | 102413425 A | 4/2012 |
| CN | 102902698 A | 1/2013 |
| CN | 103188310 A | 7/2013 |
| EP | 2 158 784 A2 | 3/2010 |
| JP | 11-328222 A | 11/1999 |
| JP | 2001-223712 A | 8/2001 |
| JP | 2001-256398 A | 9/2001 |
| JP | 2001-318845 A | 11/2001 |
| JP | 2002-015215 A | 1/2002 |
| JP | 2002-304562 A | 10/2002 |
| JP | 2003-006543 A | 1/2003 |
| JP | 2003-091678 A | 3/2003 |
| JP | 2003-115001 A | 4/2003 |
| JP | 2003-121171 A | 4/2003 |
| JP | 2003-203084 A | 7/2003 |

(56) References Cited

FOREIGN PATENT DOCUMENTS

| | | | |
|---|---|---|---|
| JP | 2003-296625 A | 10/2003 |
| JP | 2004-078674 A | 3/2004 |
| JP | 2004-157499 A | 6/2004 |
| JP | 2004-272463 A | 9/2004 |
| JP | 2004-325215 A | 11/2004 |
| JP | 2007-293823 A | 11/2007 |
| JP | 2010-020802 A | 1/2010 |
| JP | 2011-023798 A | 2/2011 |
| JP | 2011-099859 A | 5/2011 |
| JP | 2014-063309 A | 4/2014 |
| JP | 2014-517943 A | 7/2014 |
| JP | 2014-519103 A | 8/2014 |
| KR | 10-2012-0071957 A | 7/2012 |
| KR | 10-2014-0015527 A | 2/2014 |
| WO | 2008/134595 A1 | 11/2008 |
| WO | 2009/075043 A1 | 6/2009 |
| WO | 2010/080938 A2 | 7/2010 |
| WO | 2013/106870 A1 | 7/2013 |
| WO | 2014/138250 A1 | 9/2014 |
| WO | 2014/210228 A1 | 12/2014 |
| WO | 2015/123363 A1 | 8/2015 |

OTHER PUBLICATIONS

Becamel, "International Preliminary Report on Patentability issued in International Application No. PCT/US2014/020781", dated Sep. 17, 2015, 8 pages.
Cho, "Office Action issued in Australian Application No. 2013205204", dated Aug. 4, 2014, 4 pages.
Civan, "U.S. Office Action issued in copending U.S. Appl. No. 13/594,771, filed Aug. 24, 2012", dated Jan. 7, 2013, 10 pages.
Cosme, "U.S. Office Action issued in copending U.S. Appl. No. 14/179,209, filed Feb. 12, 2014", dated Nov. 24, 2015, 28 pages.
Cosme, "U.S. Office Action issued in copending U.S. Appl. No. 14/179,209, filed Feb. 12, 2014", dated May 11, 2016, 31 pages.
IP.com, "Time-Limited Coupons and Tickets for Wearable Display, with Peer-to-Peer Replication", Jun. 17, 2014, 5 pages.
Jeong, "Office Action issued in Korean Application No. 10-2014-7023023", dated Jun. 22, 2015, 6 pages of English Translation and 6 pages of Korean Office Action.
Ji, "International Search Report and Written Opinion issued in International Application No. PCT/US2014/020781", dated Jun. 27, 2014, 11 pages.
Khan, "U.S. Office Action issued in copending U.S. Appl. No. 13/369,182, filed Feb. 8, 2012", dated Sep. 9, 2014, 11 pages.
Ko, "International Search Report and Written Opinion issued in International Application No. PCT/US2014/044202", dated Sep. 30, 2014, 9 pages.
Kolmel, et al., "Real Life Scenarios of Location Based Advertising", Jan. 1, 2003, 9 pages.
Lau, "U.S. Office Action issued in copending U.S. Appl. No. 13/842,088, filed Mar. 15, 2013", dated Dec. 6, 2013, 11 pages.
Lau, "U.S. Office Action issued in copending U.S. Appl. No. 13/842,088, filed Mar. 15, 2013", dated Mar. 19, 2014, 6 pages.
Lau, "U.S. Office Action issued in copending U.S. Appl. No. 14/572,755, filed Dec. 16, 2014", dated Apr. 12, 2016, 8 pages.
Lee, "International Search Report and Written Opinion issued in International Application No. PCT/US2013/021594", dated Apr. 1, 2013, 11 pages.
Maslin, "International Search Report and Written Opinion issued in International Application No. PCT/US2015/015511", dated May 28, 2015, 11 pages.
Moon, "International Preliminary Report on Patentability issued in International Application No. PCT/US2013/021594", dated Jul. 24, 2014, 8 pages.
Nyugen, "U.S. Office Action issued in copending U.S. Appl. No. 13/786,416, filed Mar. 5, 2013", dated Jun. 18, 2013, 15 pages.
Oz, "Management Information Systems", Sixth Edition, Cengage Course Technology, 2009, 36 pages Raymond, "U.S. Office Action issued in copending U.S. Appl. No. 13/786,434, filed Mar. 5, 2013", dated Aug. 27, 2015, 8 pages.
Seong, "Office Action issued in Korean Application No. 10-2016-7002538", dated Mar. 2, 2016, 4 pages of English Translation and 3 pages of Korean Office Action.
Sivji, "U.S. Office Action issued in copending U.S. Appl. No. 13/931,751, filed Jun. 28, 2013", dated Sep. 16, 2013, 22 pages.
Sivji, "U.S. Office Action issued in copending U.S. Appl. No. 13/950,511, filed Jul. 25, 2013", dated Nov. 21, 2013, 18 pages.
Sivji, "U.S. Office Action issued in copending U.S. Appl. No. 14/329,812, filed Jul. 11, 2014", dated Sep. 15, 2014, 17 pages.
Sivji, "U.S. Office Action issued in copending U.S. Appl. No. 14/727,795, filed Jun. 1, 2015", dated Mar. 15, 2016, 15 pages.
Sivji, "U.S. Office Action issued in copending U.S. Appl. No. 14/727,795, filed Jun. 1, 2015", dated Oct. 26, 2015, 20 pages.
Spilling, et al., "Performance Enhancement in Cellular Networks with Dynamic Cell Sizing", The 11th IEEE International Symposium on vol. 2, 2000, pp. 1589-1593.
Stikeman, "Biometrics", Technology Review, vol. 104, No. 1, Jan. 1, 2001, 3 pages.
Cosme, "U.S. Office Action issued in copending U.S. Appl. No. 14/179,209, filed Feb. 12, 2014", dated Sep. 6, 2016, 33 pages.
Kihou, "Japanese Office Action issued in Japanese Application No. 2015-563130", dated Aug. 29, 2016, 3 pages of English Translation and 2 pages of Japanese Office Action.
Lau, "U.S. Office Action issued in copending U.S. Appl. No. 14/572,755, filed Dec. 16, 2014", dated Sep. 13, 2016, 15 pages.
Zhou, "Chinese Office Action issued in Chinese Application No. 201480046073.2", dated Aug. 25, 2016, 8 pages of English Translation and 6 pages of Chinese Office Action.
Wuilleme, "Supplementary European Search Report issued in European Application No. 14760121.5", dated Nov. 11, 2016, 6 pages.
Cranley, "Extended European Search Report issued in European Application No. 14817048.3", dated Dec. 19, 2016, 11 pages.
Atkinson, "Canada Office Action received for Canada Patent Application No. 2,939,368", dated Feb. 2, 2017, 3 pages.
Lau, "U.S. Office Action issued in copending U.S. Appl. No. 14/572,755, filed Dec. 16, 2014", dated Mar. 2, 2017, 17 pages.
Sivji, "U.S. Office Action issued in copending U.S. Appl. No. 15/420,676, filed Jan. 31, 2017", dated Feb. 27, 2017, 25 pages.
Zhou, "Chinese Office Action issued in Chinese Application No. 201480046073.2" dated Feb. 13, 2017, 3 pages of English Translation and 3 pages of Chinese Office Action.
U.S. Appl. No. 15/420,676 to Wang et al. filed Jan. 31, 2017.
Cosme, "U.S. Office Action issued in copending U.S. Appl. No. 14/179,209, filed Feb. 12, 2014", dated Mar. 17, 2017, 35 pages.
Simon, "Australian Office Action issued in Australian Application No. 2015217150", dated Mar. 14, 2017, 3 pages.
Wuilleme, "Extended European Search Report issued in European Application No. 14760121.5", dated Mar. 27, 2017, 19 pages.
Li, "Chinese Office Action issued in Chinese Application No. 201480023923.7", dated Mar. 21, 2017, 25 pages of English Translation and 14 pages of Chinese Office Action.
Seong, "Korean Office Action issued in Korean Application No. 10-2016-7023937", dated Jun. 9, 2017, 10 pages of English Translation and 8 pages of Korean Office Action.
Lau, "U.S. Office Action issued in copending U.S. Appl. No. 14/572,755, filed Dec. 16, 2014" dated Jun. 19, 2017, 11 pages.
"Chinese Office Action issued in Chinese Application No. 201480046073.2", dated Jul. 11, 2017, 7 pages of English Translation and 6 pages of Chinese Office Action.
Bai, "International Preliminary Report on Patentability issued in International Application No. PCT/US2015/015511", dated Aug. 25, 2016, 10 pages.
U.S. Appl. No. 15/710,351 to Wang et al. filed Sep. 20, 2017.
Luo, "Chinese Office Action issued in Chinese Application No. 201580008619.X", dated Aug. 3, 2017, 17 pages of English Translation and 12 pages of Chinese Office Action.
Cosme, "U.S. Office Action issued in copending U.S. Application No. 14/179,209 filed Feb. 12, 2014", dated Sep. 7, 2017, 29 pages.
Cranley, "European Office Action issued in European Application No. 14817048.3", dated Sep. 19, 2017, 10 pages.

(56) References Cited

OTHER PUBLICATIONS

Kumondai, "Japanese Office Action issued in Japanese Application No. 2016-551248", dated Sep. 15, 2017, 4 pages of English Translation and 6 pages of Japanese Office Action.
Simon, "Australian Office Action issued in Australian Application No. 2015217150", dated Sep. 14, 2017, 4 pages.
Watanabe, "Japanese Office Action issued in Japanese Application No. 2017-011007", dated Feb. 5, 2018, 7 pages of English Translation and 6 pages of Japanese Office Action.
Sivji, "U.S. Office Action issued in copending U.S. Appl. No. 15/710,351, filed Sep. 20, 2017", dated Mar. 12, 2018, 23 pages.
Wuilleme, "European Office Action issued in European Application No. 14760121.5", dated Jan. 30, 2018, 9 pages.
Watanabe, "Japanese Office Action issued in Japanese Application No. 2017-011007", dated Feb. 5, 2018, 7 pages of English Translation and 6 pagese of Japanese Office Action.

* cited by examiner

CONFIGURABLE POINT OF INTEREST ALERTS

TECHNICAL FIELD

The present disclosure relates generally to point of interest identification, and more particularly to delivering server-controlled point of interest zones and alerts to a user computing device.

BACKGROUND

Location data from a mobile device can be used for numerous applications. There are applications that use the location data for locating friends, playing games, and assisting a user with directions. The location data can also be used to alert a user when the user and the user's device are in the vicinity of a point of interest ("POI"). A POI is any business, institution, or other location that would be of interest to a user or for which the user may have a coupon or other offer.

In an example, a user may choose to be alerted every time the user nears a particular store or restaurant, or the server may identify a POI as a nearby store that the user frequents and that is currently offering a promotion or coupon. This alert is an example of geo-fencing. A geo-fence is a virtual perimeter or zone for a real-world geographic area. A geo-fence could be dynamically generated—as in a radius around a store or point location. When the location-aware user computing device user enters or exits a geo-fence, the device receives a generated notification. The geo-fence notice might be sent to a user computing device.

Unfortunately, POI information is constantly changing. New stores are built, promotions are updated, and the user location changes. A user may desire constantly updated POI information, but the mobile devices are not typically capable of maintaining a database of all the POIs and POI marketing data. Trying to maintain this data may have an adverse effect on the data storage capacity of the device, the battery life of the device, the required data transmission capacity, or other aspects of operating a mobile device.

Conversely, monitoring the location of the user device by the server and continually providing updates with POI data as the mobile device changes locations also adversely affects the battery, storage capacity, and data transmission capacity of the device.

Additionally, conventional geo-fence alerts provide the same alert to a user whenever the user enters the proximity of a point of interest. The alert can become a nuisance if the point of interest is in a location that the user passes often. For example, the point of interest may be located next to the home or office of the user. The user might enter the geo-fence perimeter of the point of interest many times during a single day. Receiving an alert every time the user passes the point of interest may cause the user to ignore alerts or even delete the point of interest.

SUMMARY

One aspect of the example embodiments described herein provides a computer-implemented method for receiving server-controlled point of interest alerts on user computing devices. The method comprises communicating, by a user computing device to a remote computing device, a request for point of interest data corresponding to points of interest within a proximity of the user computing device, the request comprising location data for the user computing device; receiving the point of interest data from the remote network device, the point of interest data comprising at least a portion of a point of interest identity, a point of interest location, and point of interest marketing data for each of a plurality of points of interest in a point of interest zone defined by the remote network device, wherein the point of interest zone is disposed in the proximity of the user computing device based on the location data; presenting the received point of interest data; identifying a particular point of interest at such time as the user computing device enters within a configured range of the particular point of interest; requesting an alert format for the particular point of interest from the remote computing device; outputting an alert regarding the particular point of interest, wherein the alert is provided by the user computing device in a manner based at least in part on the alert format received from the remote computing device.

Another aspect of the example embodiments described herein provides a computer-implemented method for receiving server-controlled point of interest zones on user computing devices. The method comprises communicating, by a user computing device to a remote computing device, a request for point of interest data corresponding to points of interest within a proximity of the user computing device, the request comprising location data for the user computing device; receiving the point of interest data from the remote network device, the point of interest data comprising at least a portion of a point of interest identity, a point of interest location, and point of interest marketing data for each of a plurality of points of interest in a point of interest zone defined by the remote network device, wherein the point of interest zone is disposed in the proximity of the user computing device based on the location data, and wherein a size of the point of interest zone is determined based on a density of available points of interest in the proximity of the user computing device, and wherein the shape of the point of interest zone is expanded in a direction of travel and contracted in a direction opposite the direction of travel, the direction of travel being determined by a comparison of changing locations of the user computing device; and presenting the received point of interest data.

These and other aspects, objects, features and advantages of the example embodiments will become apparent to those having ordinary skill in the art upon consideration of the following detailed description of illustrated example embodiments.

DETAILED DESCRIPTION OF THE EXEMPLARY EMBODIMENTS

Overview

Figure 1:
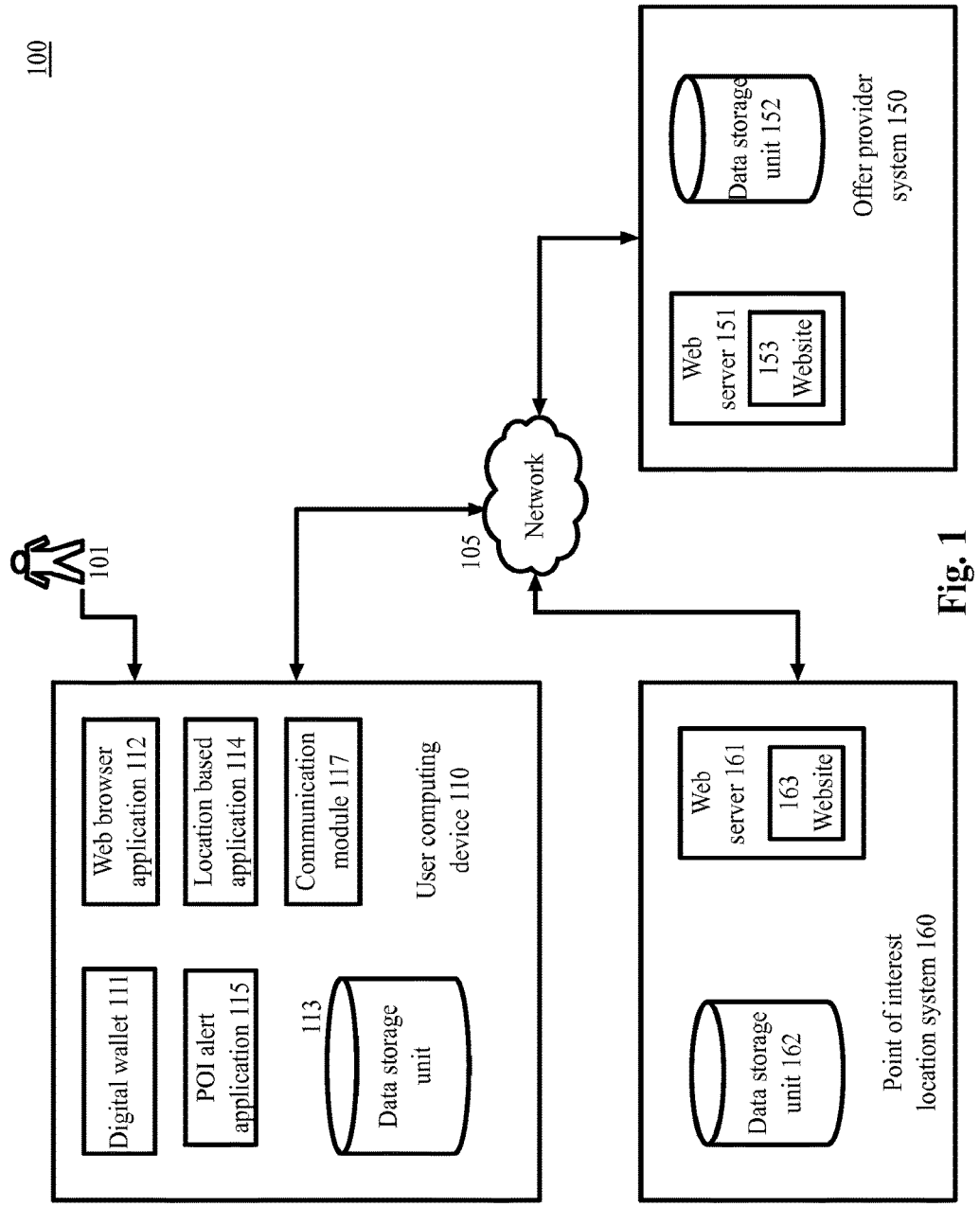
FIG. 1 is a block diagram depicting an operating environment of a point of interest location system, in accordance with certain exemplary embodiments.

The exemplary embodiments provide a point of interest ("POI") alert application that can utilize a user's location data for delivering server-controlled POI zones to a mobile device. In some embodiments, the user must engage in specific activity in order for the user's location to be used in the techniques described herein. For example, a user may install a POI alert application on their mobile device and/or configure an account on a server in order to engage in the techniques described herein. The POI alert application can provide a user interface for entering configuration information. The POI alert application can gather the location of the user from any location identifying technology available to the user device. For example, the user device can use the Wi-Fi transmissions in a given location to identify the location of the user device. Additionally or alternatively, the POI alert application employs the Global Positioning System ("GPS") location technology or other location identifying technology of the user device to determine the location of the device, and thus the location of the user. This location can be transmitted to a server located in a POI monitoring system. The POI alert application might gather the location data directly from the user device operating system, or the POI alert application might request the location from another location-based application operating on the phone.

The POI location system receives the location data from the user device and identifies the geographical location of the device. The POI location system then accesses a database for POI information in the vicinity of the user device. The POI information may be anything that would be of interest to the user. The category of POI information accessed might be user configured or may be selected by the POI location system server based on the user's prior activities, interests, or suggestions.

Examples of POIs that may be identified by the server for transmitting to the user device might include, but would not be limited to, restaurants, stores, or other businesses frequented by the user, businesses currently offering a sale or promotion, businesses currently offering an electronic coupon, tourist attractions, museums, friends identified by their devices, or any other identifiable entity in which the user may be interested.

The POI information can be any data, offers, or other information in which the user might be interested. The POI information can be a coupon, rebate, or other offer. The POI information can be a prepaid offer for which the user has paid. The POI information can be a prepaid pass, such as a movie ticket, boarding pass, event ticket, subway pass, or other pass for which the user has paid. The POI information can be related to a loyalty program to which the user belongs. For example, the POI information can be an update of the user's loyalty points or other indication of the loyalty status of the user.

The POI location system identifies the POIs in the user's vicinity and uses the density or quality of the POI information to establish the size and boundaries of the POI zone to transmit to the user device. The POI location system may limit the size of the POI zone to prevent any adverse effects caused by transmitting a quantity of data that is too large for the user device and the system to operate efficiently. For example, if the amount of POI data transmitted is too large, the data may require enough capacity on the data storage unit of the device to affect the normal operating of the device. Alternatively, if the size of the POI zone is too small, the POI location system may be forced to transmit a new zone of POIs to the device too frequently to be practical. For example, if the POI zone data were transmitted too frequently, it might consume the battery life of the device.

In an example embodiment, the POI location system can alter the shape of the POI zone based on the estimated or approximated situation of the user and the user device. For example, the POI location system can recognize how fast the user device is moving. The POI location system can determine the speed of the user by monitoring the change in location of the user device over a period of time. In an example, the POI location system can categorize the speed of the user into a set of categories. The user may be determined to be moving at a walking speed, biking speed, low driving speed, high driving speed, or not moving.

The size and shape of the zone may be altered based on the velocity of the user. For example, if a user is driving in a car on an interstate, the situation of the user is placed in the high driving speed category. The POI zone for a user in a high driving speed category can be adjusted to better predict POIs for which the user may be more interested. For example, the user may be more likely to visit a POI that is in the direction of travel than a POI behind the direction of travel. Additionally, the user may be more likely to visit a POI that is further ahead in the direction of travel than a POI that is closer to the user, but not in the direction of travel. For instance, the user may plan the next stop further in advance when traveling at a high rate of speed than when walking Thus, an example POI zone for a user traveling at a high driving speed might be bigger in the direction of travel than behind the direction of travel. Further, the entire POI zone may be bigger further along in the direction of travel and smaller close to the user.

In another example, the POI location system can determine the road that a user is traveling on and restrict the POI zone to POIs within a configured distance from the road. For example, the POI location system can receive a series of locations of the user device and compare the locations to a map of interstates, highways, and other suitable roads. If the POI location system determines, based on the comparison, that a user is traveling on a particular interstate, then the POI location system can restrict the POI zone to areas within a configured distance from the particular interstate. The shape of the POI zone can be altered to follow the direction of the particular interstate. That is, the POI zone can follow the turns and changes of direction of the particular interstate on which the user is travelling.

In another example, the user may be categorized as walking That is, based on the locations received by the POI location system over a period of time, the POI location system determines a speed of travel and determines that the user speed matches the characteristics of a user that is walking The POI zone may be adjusted accordingly. For example, the POI zone may be larger in the direction of travel than behind the direction of travel. In the example, the width of the POI zone in the direction of travel may be closer to the width of the POI zone behind the direction of travel as compared to a user traveling at a high driving speed. As a user that is walking can more easily reverse directions than a user traveling at a high driving speed, the POI location system can determine that POIs behind the user may be nearly as relevant to a user as POIs in the direction of travel.

The POI location system may additionally prioritize the POI data. Based on user input or an analysis of user historical data, such as purchasing history or website usage, the POI location system may provide a ranked list of the POIs to the user device. This ranked list may be used by the POI alert application to determine when or how to alert the user to the proximity of a particular POI. For example, the POI alert application may display all POIs on a map of the zone, but only alert the user when they arc approaching one of the top ten ranked POIs.

Another example of a prioritizing factor might be the value or quantity of coupons or offers being marketed by a POI. For example, the POI alert application may not alert a user 101 to a nearby POI if a better promotion is being offered by a neighboring business.

In another example, the POI location system may provide the POI data on a map and highlight higher ranked POIs. The higher ranked POIs may have a larger icon or logo, be in a different color than lower ranked POIs, or in any other manner be highlighted on the map.

The POI alert application on the user device receives the zone boundaries and the POI information. The POI alert application may be an application running on the user device that is configured for any type of POI locating activity. For instance, the POI alert application may be an application that is configured to alert a user to restaurants or stores that are a favorite of the user or are currently offering a coupon. The POI alert application may alert a user to museums or tourist attractions. The POI alert application may alert a user of other devices operating in the area that may be contacts of the user. The POI alert application may be focused on alerting a user to any other business or entity that the user or the server configures the POI alert application to monitor.

In an alternate example, the POI alert application is an application that provides POI data to other applications. The POI alert application may receive the POI zone and POI information and provide the POI information to other applications operating on the user device. For example, the POI alert application may retain the POI information and provide the information to a second application that provides dining coupons to a user. When the user nears a restaurant associated with a coupon received by the POI alert application, the POI alert application can alert the second application to the location of the POI and provide the coupon to the second application. Alternatively, the POI alert application may provide all proximate POIs to the second application upon receipt from the POI location system. Any suitable interaction between the POI alert application and any other applications can be performed to provide the POI information to the user.

After receiving the POI and zone information, the POI alert application may display the information on a map or other grid via the user interface of the POI alert application. Additionally or alternatively, the POI alert application may display the information to the user in any other format that can convey the information, such as a simple listing of each POI and the distance away from the user that each POI is located. The POI alert application may further provide a route to the POI upon request from the user.

If displaying the information on a map view, the POI alert application may expand or collapse the data displayed to the user depending on the density of the data. For example, if a large number of POIs are located in a localized area, the POI alert application may group POIs together and show the grouping in a single icon or notation. An example of this may be a shopping complex that contains a quantity of POIs too great to display on a user device. The display may simply show a shopping complex notation and list the number of POIs contained at that location or any other manner of representing the group of POIs. As the user approaches the dense POI, the grouped POI may expand to show the individual POIs in that area.

After receiving the POI information, the mobile device continues to monitor the location of the user device. If the device approaches a POI, the POI alert application may perform any alert function configured by the user. For instance, the POI alert application may alert a user when the user device is within a configured range of the POI, such as within a block of the POI, or when arrival at or near the POI is expected within a certain time period (e.g., an alert for a scenic lookout point might appear 20 minutes before expected arrival at the vista point so that the user has time to consider whether to stop at that vista point; As another example, an alert for a museum might appear 10 minutes before expected arrival at the interchange at which the user would have to exit to drive to the museum). The alert may additionally take any configured form desired by the user. In exemplary embodiments, the POI alert application may use the alert internally or may provide an audible alert, a vibration, a visible alert, such as showing the POI details on the display of the user device, providing an e-mail, or employing any other configurable alerting procedure. In an alternate embodiment, the POI alert application may alert the POI location system that the device is approaching a POI. The POI location system may perform any alert function configured by the user or store the alert for later use. The POI location system may send an alert to the POI alert application or to another location. For example, the POI location system may send an email, push notification, text message, or another communication to the user.

In an example embodiment, the POI location system provides coupons or other offers to the POI alert application when the user device approaches a POI. For example, when the POI alert application determines that the user device is within a configured distance from a POI, the POI alert application can notify the POI location system, another application operating on the user device, or any suitable system. The POI alert application, the POI location system, or another system, can provide to the user an offer associated with the POI.

For example, the POI alert application can recognize that the location of the user device is within a configured proximity of a POI and access an offer associated with the POI that has been provided by the POI location system (e.g., continuing the example from above, the user might be offered a discount on admission to the museum along with the alert about the museum). The offer may have been provided at the time of the transmitting of the POI zone and the POI information. Alternatively, the POI alert application can contact the POI location system, provide the identity of a proximate POI, and request any offers associated with the POI. The POI location system can provide the offer or prompt a third party system to provide the offer to the user. Alternatively, the POI alert application can provide the identity of the proximate POI to a second application operating on the user device. The second application can provide a suitable offer to the user on a user interface associated with the second application, on the POI alert application, or in any suitable manner. In an alternate embodiment, the offers associated with the POI may be transmitted to the POI alert application at any time and stored in any location on the user device.

In an example embodiment, the POI alert application can provide a ticket or other prepaid pass to the user. For example, when the user approaches a POI, such as a movie theater or an airport, the POI alert application can provide the alert to the user along with the tickets or other pass. The ticket can be displayed on the user interface of the user computing device and a barcode or other ticket identifier can be displayed for viewing or scanning. In another example, the ticket can be transmitted to a merchant system wirelessly from the user computing device. In another example, the POI information can be a boarding pass at an airport, a subway pass, or any other suitable pass.

In another example, the POI alert application can provide loyalty account information to the user. For example, the POI alert application can alert the user when approaching a POI. The POI alert application can provide an update of the loyalty status of the user account, a number of loyalty point accrued, an offer associated with the loyalty account, or any other suitable loyalty information.

In an example embodiment, an alert schedule can be configured. The alert schedule can be configured by the POI alert application, an offer application, the POI location system, the user, or any suitable party. The POI alert application provides a configured alert to the user upon approaching a POI for the first time and revises the alert for subsequent approaches to the POI. For example, if a user approaches a POI associated with an offer for the first time, the POI alert application may provide an audible alert, a vibration alert, and display a visual notification of the alarm on a user interface of the user device. The POI may be a location next to the home or office of the user and the user may pass the POI many times during a day. The user may prefer not to receive many alerts associated with the same offer. Thus, the second time that the user approaches a POI, then the POI alert application may provide only a visual notification of the offer and not provide the audible and vibration alerts. The third time a user approaches a POI, the POI alert application may not provide any notification to the user.

Any variation of subsequent notifications may be utilized. For example, a certain offer may be configured to increase in notification intensity with each approach of the user, such as an audible alert that increases in volume with each approach of the user to the POI. In another example, the may provide a different alert with each approach of the user, such as a rotation between a vibration, audible alarm, and visual notification. In another example, the notification configuration may be reset after a period of time has elapsed. That is, if a configured amount of time has elapsed since the first approach of the user to the POI, then the process will reset and the original alert will be employed the next time the user approaches the POI.

In an example, a user has an offer for a coupon on an item at a coffee shop that is next to the home of the user. When the user leaves home in the morning, the POI alert application recognizes that the user is approaching a POI and provides an audible alert and a visual notification of an offer associated with the coffee shop. When the user arrives home in the evening and passes the coffee shop, the POI alert application recognizes based on a review of provided alerts stored on the user device or elsewhere, that the offer was provided to the user earlier that day. Thus, based on the configuration of the offer, the POI alert application provides only a vibration alert and a visual notification of the offer. The user leaves home for dinner and passes the coffee shop on the way out and then again upon returning home. The POI alert application recognizes that the offer has been presented multiple times that day, and does not provide the offer again. In the example, when the user passes the coffee shop the next morning when leaving home, the POI alert application determines how long has elapsed since the first alarm the previous day. If a greater amount of time has elapsed than the configured time, then the POI alert application resets the alert schedule for the offer. When the user approaches the coffee shop, the POI alert application can provide an audible alert and a visual alert. Subsequent alerts can follow the configured schedule.

In certain examples, the alert schedule can reset on any schedule. For example, the alert schedule can reset after 12 hours, 2 days, 1 week, or any configured time period. In one example, the time period is based on a time period from the first scheduled alert. In another example, the time period is based on the time since the last approach to the POI. That is, the alert schedule will not reset until the user has not approached the POI for the configured time period. In another example, the alert schedule can reset after a certain number of alerts, such as 3, 5, 10, or any suitable number of alerts. Any other configuration of the alert schedule can be utilized.

In an example embodiment, the POI alert application can use the hours of operation of a POI to adjust the alert schedule. For example, the POI alert application or the POI location system 160 can determine the hours of operation of a business, such as by locating the information on a webpage of the POI, and associate the hours of operation with the POI in a database. The POI alert application can be configured to provide an alert associated with the POI only at a time when the POI is open for business. In another example, the POI location system can determine the type of business with which the POI can be categorized. For example, the POI location system can determine the type of business based on a review of the website of a POI, a merchant category code received from a transaction, or in any suitable manner. If the POI location system is unable to determine the exact hours of operation of the business, then the POI location system can configure an estimate of the hours of operation based on the type of business of the POI. For example, the POI location system can estimate that a museum would be open from 8 AM to 8 PM each day. The POI location system can estimate that a night club would be open from 5 PM to 2 AM each day. Any other method of estimating the hours of operation of a business can be employed.

In another example, the alert schedule can be configured to provide offers to a user that are relevant to the time of day of the offer. For example, the POI location system can determine that an offer for a discount on a breakfast item should only be presented to the user in the morning. In another example, the POI location system can determine that an offer for a discount for that is only valid after a time, such as 5 PM, will only be presented at a time after the time when the offer becomes valid.

In an example embodiment, the POI location system can monitor coupons, sales, rebates, and other offers associated with a POI of the user and identify any changes or other revisions to the offers. If the POI location system identifies a revision to an offer, the POI location system can determine if the revised offer is in the current POI zone of the user. If the offer that has changed is in the current POI zone of the user, then the POI location system can provide the revised offer to the POI alert application.

For example, the user receives from the POI location system a new POI zone and any offers associated with the POIs located in the POI zone. The POI location system is then notified of a revision or other change to an offer. The revision may be an expiration of a coupon, a newly created offer, a change of terms on an offer, or any suitable revision. The notification of the revision may be provided to the POI location system by an offer creator, an offer managing system, a merchant system, a payment processing system, or any suitable system or offer provider. Additionally or alternatively, the offer may be revised by the POI location system or a system related to the POI location system.

In the example, the POI location system provides the offers to the POI alert application on the user device that are associated with POIs in the current POI zone. In alternate embodiments, the POI location system only provides the offer to the POI alert application at the time that the user device is in a configured proximity to the POI. The POI location system determines that the revised offer has been provided to the POI alert application on the user device by comparing the revised offer to a list of offers that were provided to the user device and the current location of the user device. The POI location system provides the revised offer to the POI alert application. If the offer is currently being presented to the user on a user interface, then the POI alert application may alert the user to the revised offer. If the POI alert application has stored the offer but not presented it to the user on a user interface, then the POI alert application receives the revised offer and either updates or replaces the previous, unrevised offer. At a time that the user device approaches the POI, the POI alert application presents the revised offer to the user on a user interface.

Example System Architectures

Turning now to the drawings, in which like numerals represent like (but not necessarily identical) elements throughout the figures, example embodiments are described in detail.

FIG. 1 is a block diagram depicting a system for selecting backing instruments, in accordance with certain example embodiments. As depicted in FIG. 1, the system 100 includes network devices 110, 150, and 160 that are configured to communicate with one another via one or more networks 105.

Each network 105 includes a wired or wireless telecommunication means by which network devices (including devices 110, 150, and 160) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110, 150, and 160 includes a device having a communication module capable of transmitting and receiving data over the network 105. For example, each network device 110, 150, and 160 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 150, and 160 are operated by end-users or consumers, offer provider system operators, and POI location system operators, respectively.

The user 101 can use the communication application 117, which may be, for example, a web browser application or a stand-alone application, to view, download, upload, or otherwise access documents or web pages via a distributed network 105. The network 105 includes a wired or wireless telecommunication system or device by which network devices (including devices 110, 150, and 160) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The user device 110 may employ a communication module 117 to communicate with the web server 161 of the POI location system 160 or other servers. The communication module 117 may allow devices to communicate via technologies other than the network 105. Examples might include a cellular network, radio network, or other communication network. The communication application 117 can interact with web servers or other computing devices connected to the network 105, including the POI server 161 of the POI location system 160, and the web server 151 of offer provider system 150.

The user computing device 110 may include a digital wallet application module 111. The digital wallet application module 111 may encompass any application, hardware, software, or process the user device 110 may employ to assist the user 101 in completing a purchase. The digital wallet application module 111 can interact with the communication application 117 or can be embodied as a companion application of the communication application 117. As a companion application, the digital wallet application module 111 executes within the communication application 117. That is, the digital wallet application module 111 may be an application program embedded in the communication application 117.

The user device 110 may include a digital wallet application module 111. The digital wallet application module 111 may encompass any application, hardware, software, or process the user device 110 may employ to assist the device to complete a purchase transaction. The digital wallet application module 111 can interact with the communication application 117 or can be embodied as a companion application of the communication application 117. As a companion application, the digital wallet application module 111 executes within the communication application 117. That is, the digital wallet application module 111 may be an application program embedded in the communication application 117.

The user device 110 may include a POI alert application 115. The POI alert application 115 can interact with the communication application 117 or be embodied as a companion application of the communication application 117 and execute within the communication application 117. In an exemplary embodiment, the POI alert application 115 may further be embodied as a companion application of the digital wallet application module 111 and execute within the digital wallet application module 111. The POI alert application 115 may employ a software interface that may open in the digital wallet application 111 or may open in the communication application 117. The interface can allow the user 101 to configure the POI alert application 115 and the user account on the offer provider system 150.

The POI alert application 115 can be used to send device location data to the POI location system 160 and receive a POI zone from the POI location system 160. The POI location system 160 that develops the POI zone can include a set of computer-readable program instructions, for example, using JavaScript, that enable the POI location system 160 to interact with the POI alert application 115.

Any of the functions described in the specification as being performed by the POI alert application 115 can be performed by the POI location system 160, the user computing device 110, the location based application 114, or any other suitable hardware or software system or application.

The user device 110 includes a data storage unit 113 accessible by the POI alert application 115 and the web browser application 112. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 may include a location based application 114 that the POI alert application 115 or the POI location system 160 may utilize to access location data for the user device 110. Examples of applications that may utilize the location data, and thus may make it available to the POI location system 160 or POI alert application 115, may include, but would not be limited to, Global Positioning System ("GPS") location technology or other location identifying technology of the user device, business finder applications, location based social networks, location based gaming, or friend locater. Additionally or alternately, the user device 110 may be capable of providing location data directly from the user device 110. The user device 110 may provide the location data to the POI alert application 115 or may be configured to transmit the location data directly to the POI location system 160.

The POI location system 160 utilizes a POI location system server 161 operating a POI monitoring application. The POI location system server 161 operating the POI monitoring application may represent the computer implemented system that the POI location system 160 employs to configure user accounts, create and maintain user profiles, collect the location data, communicate with the offer provider system 150, develop proximate POI maps and zones, and submit the data to the user 101. The POI location system website 163 may represent any web-based interface that allows users to interact with the POI location system 160 to configure the user accounts and change account settings. The POI location system web server 161 can communicate with one or more offer provider systems 150, and a user device 110 via any available technologies. These technologies may include, but would not be limited to, an Internet connection via the network 105, email, text, instant messaging, or other suitable communication technologies. The POI location system 160 may include a data storage unit 162 accessible by the server 161 of the POI location system 160. The data storage unit 162 can include one or more tangible computer-readable storage devices.

Any of the functions described in the specification as being performed by the POI location system 160 can be performed by the POI alert application 115, the user computing device 110, the location based application 114, or any other suitable hardware or software system or application.

The offer provider system 150 utilizes an offer provider system web server 151. The offer provider system web server 151 may represent the computer-implemented system that the offer provider system 150 employs to provide POI identities, locations, marketing information, and descriptions to the POI location system 160. The offer provider system 150 may represent any number of systems that may be polled by the POI location system 160 to gather POI information. For example, the offer provider system 150 may be the marketing system of a product manufacturer or a service provider. The offer provider system 150 may be a social network system of a user that can provide preferences and historical data of a user's activities. The offer provider system 150 may be a coupon aggregator or provider. The offer provider system 150 may be a mapping program. The offer provider system 150 may be any other service or system that may provide information that the POI location system 160 can use to define a POI zone and prioritize the POIs.

The offer provider system 150 can communicate with a POI location system 160 and user devices 110 via any available technologies. These technologies may include, but would not be limited to, an Internet connection via the network 105, email, text, instant messaging, or other suitable communication technologies. The offer provider system 150 may include a data storage unit 152 accessible by the server 151 of the offer provider system 150. The data storage unit 152 can include one or more tangible computer-readable storage devices.

It will be appreciated that the network connections shown are exemplary and other means of establishing a communications link between the computers and devices can be used. Moreover, those having ordinary skill in the art having the benefit of the present disclosure will appreciate that the user device 110, offer provider system 150, and POI location system 160 illustrated in FIG. 1 can have any of several other suitable computer system configurations. For example, a user device 110 embodied as a mobile phone or handheld computer may not include all the components described above.

Example Processes

Figure 2:
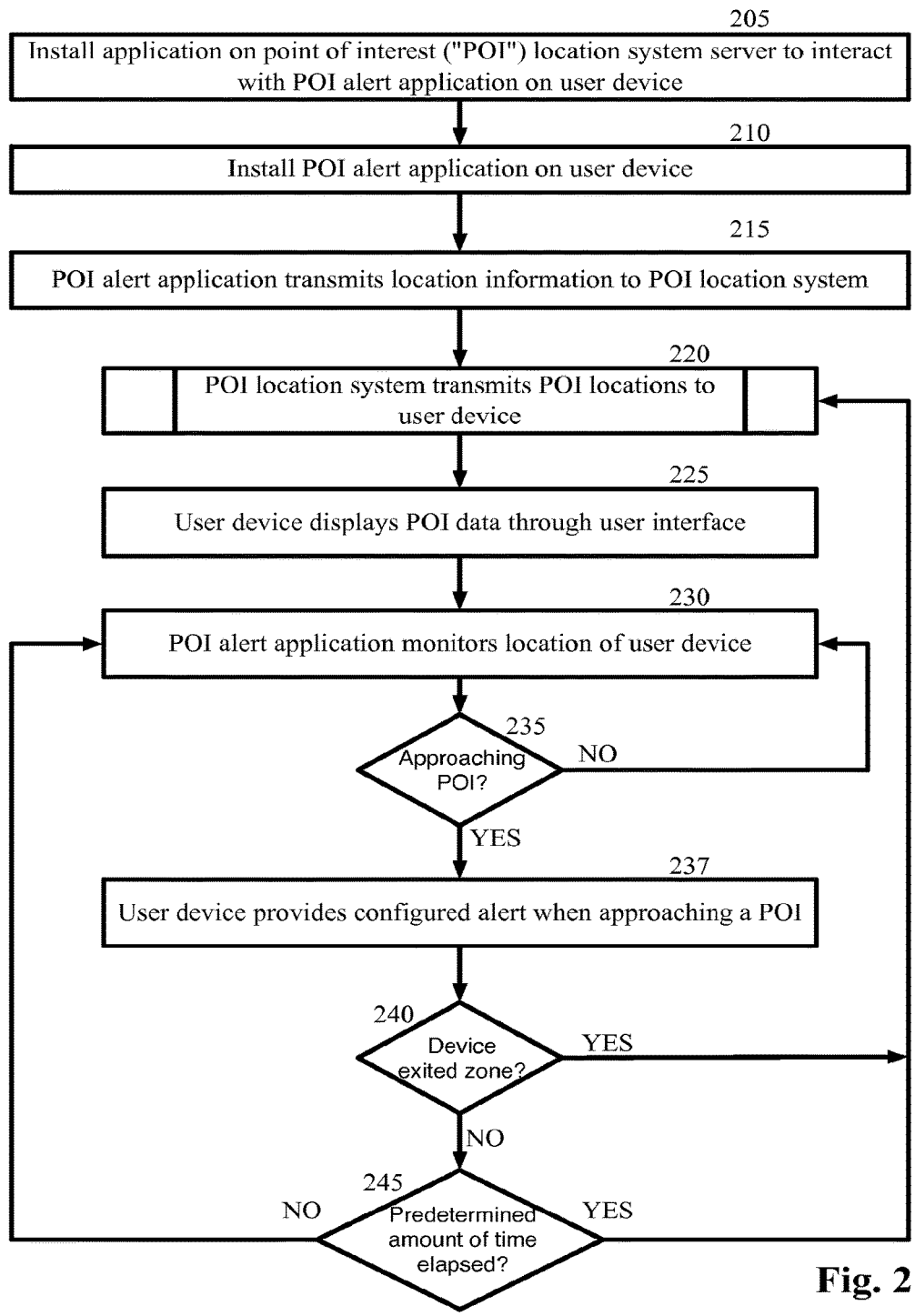
FIG. 2 is a block flow diagram depicting a method for supplying a user device with proximate points of interest, in accordance with certain exemplary embodiments.
Figure 3:
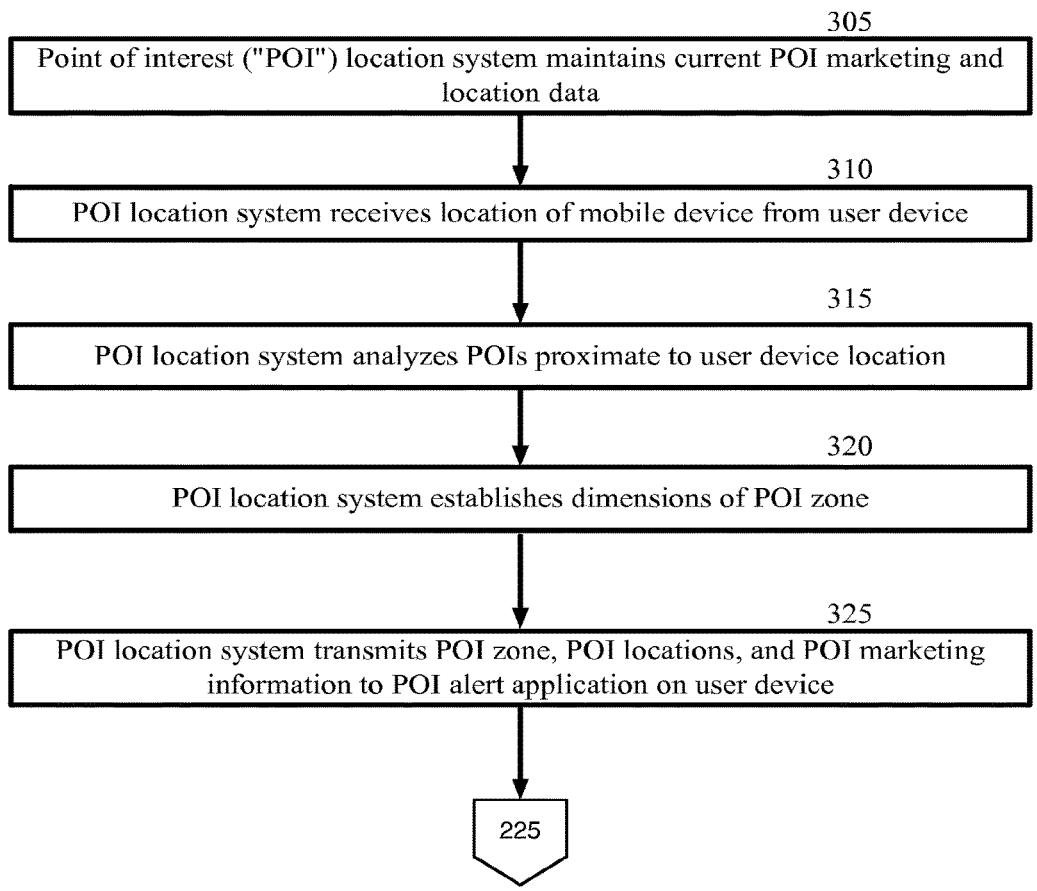
FIG. 3 is a block flow diagram depicting a method for generating and transmitting points of interest to a user device, in accordance with certain exemplary embodiments.

The example methods illustrated in FIG. 2-3 are described hereinafter with respect to the components of the example operating environment 100. The example methods of FIG. 2-3 may also be performed with other systems and in other environments.

FIG. 2 is a flow chart depicting a method 200 for supplying a user device with proximate points of interest, in accordance with certain exemplary embodiments.

With reference to FIGS. 1 and 2, in block 205, the point of interest ("POI") location system 160 installs computer-readable program instructions on the POI location system server 161 for interacting with the POI alert application 115 on the user device 110. Additionally, the POI location system 160 installs computer-readable program instructions on the POI location system server 161 for interacting with the offer provider system 150. In an exemplary embodiment, these computer-readable program instructions may be implemented as an embedded script, such as JavaScript, in the POI location system server 161.

In block 210, the user 101 installs a POI alert application 115 on the user device 110. In certain exemplary embodiments, the user 101 may navigate to a website of a provider of the POI alert application 115 and download and install the POI alert application 115. The website that provides the POI alert application 115 may be the POI location system website 153. The POI alert application 115 may be embedded in a digital wallet 112 on a user device 110. The user 101 may utilize a user interface of the POI alert application 115 for configuration. The user 101 may configure privacy settings provided by the POI alert application 115.

Additionally, the user 101 may communicate with the computer-readable program instructions on the POI location system 160 to establish user identification and account configuration. The communication with the POI location system 160 may be made via any available technology including, but not limited to, an Internet connection via the network 105, text, email, or a cellular connection. On the POI location system 160 and the POI alert application 115, the user 101 may configure the categories of POIs that are monitored. The user 101 may additionally configure privacy settings provided by the POI location system 160.

The POI alert application 115 may additionally or alternatively communicate with the POI location system 160 to establish the format in which the POI data should be transmitted. For example, a POI alert application 115 that does not employ a map display feature may only require a listing of POIs. A POI alert application 115 may request any other format or data that is available from the POI location system 160.

The user 101 may additionally configure the alerting mechanism of the POI alert application 115. The POI alert application 115 may provide an audible alert, a vibration, a visible alert, such as showing the POI details on the display of the user device, or any other configurable alerting procedure. The alert may additionally or alternatively be incorporated by any other application that could benefit from the POI alert.

In block 215, the user 101 initiates the POI alert application 115 by actuating a physical or virtual button, making a motion such as a "tap" or swipe with the user device 110, speaking a voice command, or performing any other initiation process. The POI alert application 115 transmits to the POI location system 160 the location of the user device 110. In a certain embodiment, the POI alert application 115 is configured to operate at all times that the user device 110 is operational. That is, the POI alert application 115 does not need to be initiated to begin transmitting location information to the POI location system 160.

The POI alert application 115 may be configured to access the location data directly from the user device 110. The user device 110 may have the capability, through computer hardware or software, or a combination thereof, to determine the geographic coordinates of the location of the user device 110. For example, the POI alert application can gather the location of the user from any location identifying technology available to the user device. For example, the user device can use the Wi-Fi transmissions in a given location to identify the location of the user device. Additionally or alternatively, the POI alert application can utilize the Global Positioning System ("GPS") to determine its location.

Additionally or alternatively, the user device 110 may include a location based application 114 that the POI alert application 115 or the POI location system 160 may utilize to access location data for the user device 110. Examples of applications that may utilize the location data, and thus may make it available to the POI location system 160, may include, but would not be limited to, business finder applications, location based social networks, location based gaming, or friend locater applications. The POI alert application 115 can request and receive a location from the location based application 114. The location based application 114 can use any of the location technologies discussed herein to determine the location of the user device 110.

In block 220, the POI location system 160 gathers POI location data and transmits the location data to the user device 110. The details of this step will be discussed in further detail in method 220 of FIG. 3.

FIG. 3 is a flow chart depicting a method 220 for generating and transmitting POIs to a user device, in accordance with certain exemplary embodiments.

With reference to FIGS. 1 and 2, in block 305 of method 220, the POI location system 160 establishes and maintains current marketing and location data of POIs that relate to a user 101. The POI data may be maintained on a database on the POI location system server 161 or any storage location available to the POI location system 160. The POI data may be anything that would be of interest to the user. The category of POI data accessed might be user configured or may be selected by the POI location system server 161 based on the prior activities, interests, or suggestions of the user 101. Examples of POIs that may be identified by the server 161 for transmitting to the user device 110 might include, but would not be limited to, restaurants, stores or other businesses frequented by the user 101, businesses currently offering a sale or promotion, businesses currently offering an electronic coupon, tourist attractions, museums, friends identified by their devices, or any other identifiable entity in which the user 101 may be interested. A list of POIs associated with the user 101 may be maintained on a database on the POI location system server 161 or any storage location available to the POI location system 160.

The POI location system 160 may access POI data from any system that may be polled by the POI location system 160 to gather POI information. For example, the POI data may be gathered from an offer provider system 150. An offer provider system 150 may be the marketing system of a product manufacturer or a service provider. The offer provider system 150 may be a social network system of a user that can provide preferences and historical data of a user's activities, a coupon aggregator or provider, a mapping system, digital phone book, or any other service or system that may provide information that the POI location system 160 can use to define a POI zone and prioritize the POIs.

In block 310, the POI location system 160 receives the location of the user device 110. The POI location system 160 stores the location of the user device 110 in the user account on the POI location system server 161 or in another suitable storage location. The POI location system 160 can interpret the location data provided by the user device 110. For example, if the location is provided as a street address or intersection, the POI location system 160 can convert the street address into a latitude and longitude location or other geo-location format. In another example, the POI location system 160 can convert a latitude and longitude location into a street address, plot the latitude and longitude on a map, or use the data in any suitable manner.

In block 315, the POI location system 160 identifies POIs in the vicinity of the location of the user device 110. The POI location system 160 may access the database maintained for the account of the user 101 and identify possible POIs. For example, the POI location system 160 can determine the distance of each possible POI from the location of the user 101. The POI location system 160 can determine the distance from the location of the user device 110 in a straight line or by following the shortest route over publicly accessible roads.

In block 320, the POI location system 160 uses the density or quality of the POI information to establish the size of the POI zone to transmit to the user device 110. The POI location system 160 may limit the size of the POI zone to prevent any adverse effects caused by transmitting a quantity of data that is too large for the user device 110 and the system to operate efficiently. For example, if the amount of POI data transmitted is too large, the data may require enough capacity on the data storage unit 113 of the user device 110 to affect the normal operation of the user device 110. Alternatively, if the size of the POI zone is too small then the POI location system 160 may be forced to transmit a new zone of POIs to the user device 110 too frequently to be practical. For example, if the POI zone data were transmitted too frequently, it might consume the battery life of the user device 110.

The size of the POI zone around the current location of the user device 110 can be determined based on the density or quality of the POI information. In an exemplary embodiment, the size of the POI zone may be established to encompass a configured number of POIs in the proximity of the user device 110. For example, the size of the POI zone can be configured to encompass a specified number of POIs, such as 50, that are closest to the user device 110 or that provide the highest priority POIs around the user device 110. Thus, in an area of high concentration of available POIs, the POI zone may be relatively small to capture the specified number of POIs. Alternatively, in an area of lower concentration of available POIs, the POI zone may be relatively large to capture the specified number of POIs. Additionally, the size of the POI zone can take any suitable shape to encompass the specified POIs.

In an example embodiment, the POI location system 160 can alter the shape of the POI zone based on the situation of the user 101 and the user device 110. For example, the POI location system 160 can recognize how fast the user device 110 is moving. The POI location system 160 can determine the speed of the user 101 by monitoring the change in location of the user device 110 over a period of time. In an example, the POI location system 160 can categorize the speed of the user 101 into a set of categories. The user 101 may be determined to be moving at a walking speed, biking speed, low driving speed, high driving speed, or not moving.

The size and shape of the zone may be altered based on the velocity of the user 101. For example, if a user 101 is driving in an automobile on an interstate, the situation of the user 101 is placed in the high driving speed category. The POI zone for a user 101 in a high driving speed category can be adjusted to better predict POIs for which the user 101 may be more interested. For example, the user 101 may be more likely to visit a POI that is in the direction of travel than a POI behind the direction of travel. Additionally, the user 101 may be more likely to visit a POI that is further ahead in the direction of travel than a POI that is closer to the user 101, but not in the direction of travel. That is, the user 101 may plan the next stop further in advance when traveling at a high rate of speed than when walking Thus, an example POI zone for a user 101 traveling at a high driving speed might be bigger in the direction of travel than behind the direction of travel. Further, the entire POI zone may be bigger further along in the direction of travel and smaller close to the user 101.

In another example, the POI location system 160 can determine the road that a user 101 is traveling on and restrict the POI zone to POIs within a configured distance from the road. For example, the POI location system 160 can receive a series of locations of the user device and compare the locations to a map of interstates, highways, and other suitable roads. If the POI location system 160 determines based on the comparison that a user 101 is traveling on a particular interstate, then the POI location system 160 can restrict the POI zone to areas within a configured distance from the particular interstate. The shape of the POI zone can be altered to follow the direction of the particular interstate. That is, the POI zone can follow the turns and changes of direction of the particular interstate on which the user 101 is travelling.

In another example, the user 101 may be categorized as walking That is, based on the locations received by the POI location system 160 over a period of time, the POI location system 160 determines a velocity of travel and determines that the user speed matches the characteristics of a user 101 that is walking. The POI zone may be adjusted accordingly. For example, the POI zone may be larger in the direction of travel than behind the direction of travel. In the example, the width of the POI zone in the direction of travel may be closer to the width of the POI zone behind the direction of travel as compared to a user 101 traveling at a high driving speed. That is, the zone may be rounder than a zone for a user 101 traveling at a high driving speed. As a user 101 that is walking can more easily reverse directions than a user 101 traveling at a high driving speed, the POI location system 160 can determine that POIs behind the user 101 may be nearly as relevant to a user 101 as POIs in the direction of travel.

The POI location system 160 may additionally prioritize the POI data. Based on input of the user 101 or an analysis of historical data, such as purchasing history or website usage of the user 101, the POI location system 160 may provide a ranked list of the POIs to the user device 110. For example, the POI location system 160 may be able to determine that a user 101 prefers a certain store or restaurant and rank it higher than an alternative restaurant even if the alternative restaurant is closer to the user 101 location. Thus, if the user 101 limits the number of POI alerts in a given zone, a lower ranked POI may be ignored in favor of a nearby, higher ranked POI.

Another example of a prioritizing factor might be the value or quantity of coupons or offers being marketed by a POI. For example, the POI alert application 115 may not alert a user 101 to a nearby POI if a better promotion is being offered by a neighboring business.

The ranked POI list may be used by the POI alert application 115 to determine when or how to alert the user to the proximity of a particular POI. For example, the POI alert application 115 may display all POIs on a map of the zone, but only alert the user 101 when they are approaching one of the top ten ranked POIs.

Another example of a prioritizing factor might be the value or quantity of coupons or offers being marketed by a POI. For example, the POI alert application 115 may not alert a user 101 to a nearby POI if a better promotion is being offered by a neighboring business.

In another example, the POI alert application 115 may provide the POI data on a map and highlight higher ranked POIs. The higher ranked POIs may have a larger icon or logo, be in a different color than lower ranked POIs, or in any other manner be highlighted on the map.

If displaying the information on a map view, the POI alert application 115 may expand or collapse the data displayed to the user depending on the density of the data. For example, if a large number of POIs are located in a localized area, the POI alert application 115 may group POIs together and show the grouping in a single icon or notation. An example of this may be a shopping complex that contains a quantity of POIs too great to display on a user device. The display may show a shopping complex notation and list the number of POIs contained at that location or any other manner of representing the group of POIs. As the user 101 approaches the dense POI, the grouped POI may expand to show the individual POIs in that area. For example, if the user 101 is between two shopping malls or between two cities, a single POI may be provided for each mall or each city, respectively. Then, as the user approaches one of the malls or one of the cities, the collapsed POI for that mall or city expands to show all POIs (or a specified number of POIs) at that location.

In an example embodiment, the POI alert application 115 can provide a ticket or other prepaid pass to the user 101. For example, when the user 101 approaches a POI, such as a movie theater or an airport, the POI alert application 115 can provide the alert to the user 101 along with the tickets or other pass. The ticket can be displayed on the user interface of the user computing device 110 and a barcode or other ticket identifier can be displayed for viewing or scanning. In another example, the ticket can be transmitted to a merchant system 130 wirelessly from the user computing device 110. In another example, the POI information can be a boarding pass at an airport, a subway pass, or any other suitable pass.

In another example, the POI alert application 115 can provide loyalty account information to the user 101. For example, the POI alert application 115 can alert the user 101 when approaching a POI. The POI alert application 115 can provide an update of the loyalty status of the user account, a number of loyalty point accrued, an offer associated with the loyalty account, or any other suitable loyalty information.

In certain exemplary embodiments, the POI location system 160 applies the extracted data to a machine learning algorithm or another statistical model to determine the most effective ranking system. For example, a machine learning algorithm can be performed on the POIs generated for one or more users to learn the ranking system that produces results having the highest usage rates. The machine learning algorithm can be updated periodically.

In block 325, the POI location system 160 transmits the POI zone dimensions, the POI identities and locations, and any associated POI marketing information or offers to the POI alert application 115. The POI location system 160 may additionally transmit the priority ranking of each of the POIs for use by the POI alert application 115.

From block 325, the method 220 proceeds to block 225 with reference to FIG. 2.

In block 225, the user device 110 incorporates the POI data into the user interface of the POI alert application 115. The POI alert application 115 may display the information on a map or other grid via the user interface of the POI alert application. Additionally or alternatively, the POI alert application 115 may display the information to the user in any other format that can convey the information, such as a simple listing of each POI and the distance away from the user that each POI is located. The POI alert application 115 may further provide a route to a POI upon request from the user. The user 101 may elect to operate the POI alert application 115 in the foreground of the host CPU 116 operating system and provide substantially instant alerts as the user 101 moves through the POI zone. The POI alert application 115 may alternatively operate in the background of the operating system and store the POI alerts for later access by the user 101.

In block 230, the POI alert application 115 monitors the location of the user device 110 as it moves through the POI zone. The POI alert application 115 compares the location of the user device 110 to known POIs identified on the most recent POI zone. The POI alert application 115 continually or intermittently determines if the user device is within a configured distance from a POI.

In block 235, the POI alert application 115 determines if a POI is being approached. For example, if a user 101 is walking through a shopping district with the user device 110 and comes within a specified distance of a POI, such as one block, the POI alert application 115 recognizes the approached POI. If a POI is being approached, the method 200 follows the "YES" branch of block 235 to block 237. If no POI is being approached, the method 200 follows the "NO" branch of block 235 to 230.

Following the "NO" branch of block 235 to block 230, the POI alert application 115 continues to monitor the location of the user device 110 as previously described.

Following the "YES" branch of block 235 to block 237, a POI alert is triggered when the user device 110 moves within a configured range of a POI. In exemplary embodiments, the POI alert application 115 may use the alert internally or may provide an audible alert, a vibration, a visible alert, such as showing the POI details on the display of the user device, an e-mail, or any other configurable alerting procedure.

The POI location system 160 may perform any alert function configured by the user 101 or store the alert for later use. The POI location system 160 may send an alert to the POI alert application 115 or to another location or application. For example, the POI location system 160 may send an email, push notification, text message, or another communication to the user.

In an example embodiment, the POI location system 160 provides coupons or other offers to the POI alert application 115 when the user device approaches a POI. For example, when the POI alert application 115 determines that the user device 110 is within a configured distance from a POI, the POI alert application 115 can notify the POI location system 160, another application operating on the user device 110, or any suitable system. The POI alert application 115, the POI location system 160, or another system, can provide to the user 101 an offer associated with the POI.

For example, the POI alert application 115 can recognize that the location of the user device 110 is within a configured proximity of a POI and access an offer associated with the POI that has been provided by the POI location system 160. The offer may have been provided at the time of the transmitting of the POI zone and the POI information. Alternatively, the POI alert application 115 can contact the POI location system 160, provide the identity of a proximate POI, and request any offers associated with the POI. The POI location system 160 can provide the offer or prompt a third party system to provide the offer to the user. Alternatively, the POI alert application 115 can provide the identity of the proximate POI to a second application operating on the user device 110. The second application can provide a suitable offer to the user 101 on a user interface associated with the second application, on the POI alert application 115, or in any suitable manner. In an alternate embodiment, the offers associated with the POI may be transmitted to the POI alert application 115 at any time and stored in any location on the user device 110.

In an example embodiment, an alert schedule can be. The alert schedule can be configured by the POI alert application 115, an offer application, the POI location system 160, the user 101, or any suitable party. The POI alert application 115 provides a configured alert to the user 101 upon approaching a POI for the first time and revises the alert for subsequent approaches to the POI. For example, if a user 101 approaches a POI associated with an offer for the first time, the POI alert application 115 may provide an audible alert, a vibration alert, and display a visual notification of the alarm on a user interface of the user device 110. The POI may be a location next to the home or office of the user 101 and the user 101 may pass the POI many times during a day. The user 101 may prefer not to receive many alerts associated with the same offer. Thus, the second time that the user 101 approaches a POI, then the POI alert application 115 may provide only a visual notification of the offer and not provide the audible and vibration alerts. The third time a user 101 approaches a POI, the POI alert application 115 may not provide any notification to the user 101.

Any variation of subsequent notifications may be utilized. For example, a certain offer may be configured to increase in notification intensity with each approach of the user 101, such as an audible alert that increases in volume with each approach of the user 101 to the POI. In another example, the may provide a different alert with each approach of the user 101, such as a rotation between a vibration, audible alarm, and visual notification. In another example, the notification configuration may be reset after a period of time has elapsed. That is, if a configured amount of time has elapsed since the first approach of the user to the POI, then the process will reset and the original alert will be employed the next time the user 101 approaches the POI.

In an example, a user 101 has an offer for a coupon on an item at a coffee shop that is next to the home of the user 101. When the user 101 leaves home in the morning, the POI alert application 115 recognizes that the user 101 is approaching a POI and provides an audible alert and a visual notification of an offer associated with the coffee shop. When the user 101 arrives home in the evening and passes the coffee shop, the POI alert application 115 recognizes based on a review of provided alerts stored on the user device 110 or elsewhere, that the offer was provided to the user 101 earlier that day. Thus, based on the configuration of the offer, the POI alert application 115 provides only a vibration alert and a visual notification of the offer. The user 101 leaves home for dinner and passes the coffee shop on the way out and then again upon returning home. The POI alert application 115 recognizes that the offer has been presented multiple times that day, and does not provide the offer again. In the example, when the user 101 passes the coffee shop the next morning when leaving home, the POI alert application 115 determines how long has elapsed since the first alarm the previous day. If a greater amount of time has elapsed than the configured time, then the POI alert application 115 resets the alert schedule for the offer. When the user approaches the coffee shop, the POI alert application 115 can provide an audible alert and a visual alert. Subsequent alerts can follow the configured schedule.

In certain examples, the alert schedule can reset on any schedule. For example, the alert schedule can reset after 12 hours, 2 days, 1 week, or any configured time period. In one example, the time period is based on a time period from the first scheduled alert. In another example, the time period is based on the time since the last approach to the POI. That is, the alert schedule may not reset until the user has not approached the POI for the configured time period. In another example, the alert schedule can reset after a certain number of alerts, such as 3, 5, 10, or any suitable number of alerts. Any other configuration of the alert schedule can be utilized.

In an example embodiment, the POI alert application 115 can use the hours of operation of a POI to adjust the alert schedule. For example, the POI alert application 115 or the POI location system 160 can determine the hours of operation of a business, such as by locating the information on a webpage of the POI, and associate the hours of operation with the POI in a database. The POI alert application 115 can be configured to provide an alert associated with the POI only at a time when the POI is open for business. In another example, the POI location system 160 can determine the type of business with which the POI can be categorized. For example, the POI location system 160 can determine the type of business based on a review of the website of a POI, a merchant category code received from a transaction, or in any suitable manner. If the POI location system 160 is unable to determine the exact hours of operation of the business, then the POI location system 160 can configure an estimate of the hours of operation based on the type of business of the POI. For example, the POI location system 160 can estimate that a museum would be open from 8 AM to 8 PM each day. The POI location system 160 can estimate that a night club would be open from 5 PM to 2 AM each day. Any other method of estimating the hours of operation of a business can be employed.

In another example, the alert schedule can be configured to provide offers to a user 101 that are relevant to the time of day of the offer. For example, the POI location system 160 can determine that an offer for a discount on a breakfast item should only be presented to the user in the morning In another example, the POI location system 160 can determine that an offer for a discount for that is only valid after a time, such as 5 PM, will only be presented at a time after the time when the offer becomes valid.

In an example embodiment, the POI location system 160 can monitor coupons, sales, rebates, and other offers associated with a POI of the user and identify any changes or other revisions to the offers. If the POI location system 160 identifies a revision to an offer, the POI location system 160 can determine if the revised offer is in the current POI zone of the user. If the offer that has changed is in the current POI zone of the user, then the POI location system 160 can provide the revised offer to the POI alert application 115.

For example, the user receives from the POI location system 160 a new POI zone and any offers associated with the POIs located in the POI zone. The POI location system 160 is then notified of a revision or other change to an offer. The revision may be an expiration of a coupon, a newly created offer, a change of terms on an offer, or any suitable revision. The notification of the revision may be provided to the POI location system 160 by an offer creator, an offer managing system, a merchant system, a payment processing system, or any suitable system or offer provider. Additionally or alternatively, the offer may be revised by the POI location system 160 or a system related to the POI location system 160.

In the example, the POI location system 160 provides the offers to the POI alert application 115 on the user device that are associated with POIs in the current POI zone. In alternate embodiments, the POI location system 160 only provides the offer to the POI alert application 115 at the time that the user device is in a configured proximity to the POI. The POI location system 160 determines that the revised offer has been provided to the POI alert application 115 on the user device by comparing the revised offer to a list of offers that were provided to the user device and the current location of the user device. The POI location system 160 provides the revised offer to the POI alert application 115. If the offer is currently being presented to the user on a user interface, then the POI alert application 115 may alert the user to the revised offer. If the POI alert application 115 has stored the offer but not presented it to the user on a user interface, then the POI alert application 115 receives the revised offer and either updates or replaces the previous, unrevised offer. At a time that the user device approaches the POI, the POI alert application 115 presents the revised offer to the user on a user interface.

In an alternate embodiment, the POI alert application 115 may alert the POI location system 160 that the device is approaching a POI. The POI location system 160 may perform any alert function configured by the user or store the alert for later use. The POI location system 160 may send an alert to the POI alert application 115 or to another location. For example, the POI location system 160 may send an email, push notification, text message, or another communication to the user.

In an alternative embodiment, the POI alert application 115 may be configured to alert the user 101 of only the higher priority POIs. As discussed in the details of method 220 of FIG. 3, the POI data may be prioritized by the POI location system 160. The POI alert application 115 may use the priority of the POI data to determine which POIs will trigger an alert to the user 101. For example, the user 101 may desire to limit the alerts to the 10 highest priority POIs in a given zone. Alternatively, the user 101 may configure the POI alert application 115 to alert the user 101 to every POI in the zone.

In block 240, if the user device 110 approaches a configured distance from the boundary of the POI zone, the method 200 follows the "YES" branch of block 240 to block 220. If the user device 110 has not approached a configured boundary of the POI zone, the method 200 follows the "NO" branch of block 240 to block 245. In an alternate embodiment of the application, the POI alert application 115 may require the user device 110 to completely exit the boundaries of the POI zone to follow the "YES" branch of block 240.

Following the "YES" branch of block 240 to block 220, the method requests and receives a refreshed POI zone. As the user device 110 has left the boundaries of the previous POI zone, the POI alert application 115 will have no POI data to display to the user 101 or monitor for alerts. A new POI zone with a new list of POIs is transmitted to the user device 110.

Following the "NO" branch of block 240 to block 245, the user device 110 determines if the user device 110 has received a new POI zone in a configured amount of time. For instance, if a user device 110 has remained in one location for a configured time or has not encountered any POIs for a configured time, the method 200 will determine that the user device 110 is idle and follow the "YES" branch of block 245 to block 220. A new POI zone with a new list of POIs is transmitted to the user device 110. The idle time required to trigger the "YES" branch of block 245 is configurable by the user 101 or the POI alert application 115. For example, the idle time required might be one hour, one day, one week, or any other time that is reasonable based upon the activities of the user 101.

If the device has not remained idle and has received a new POI zone within the configured time, the method 200 follows the "NO" branch of block 245 to block 230. The device will continue monitoring the location of the user device 110.

The method 200 continues until the user 101 deactivates the POI alert application 115 or the user device is shut down.

Example Systems

Figure 4:
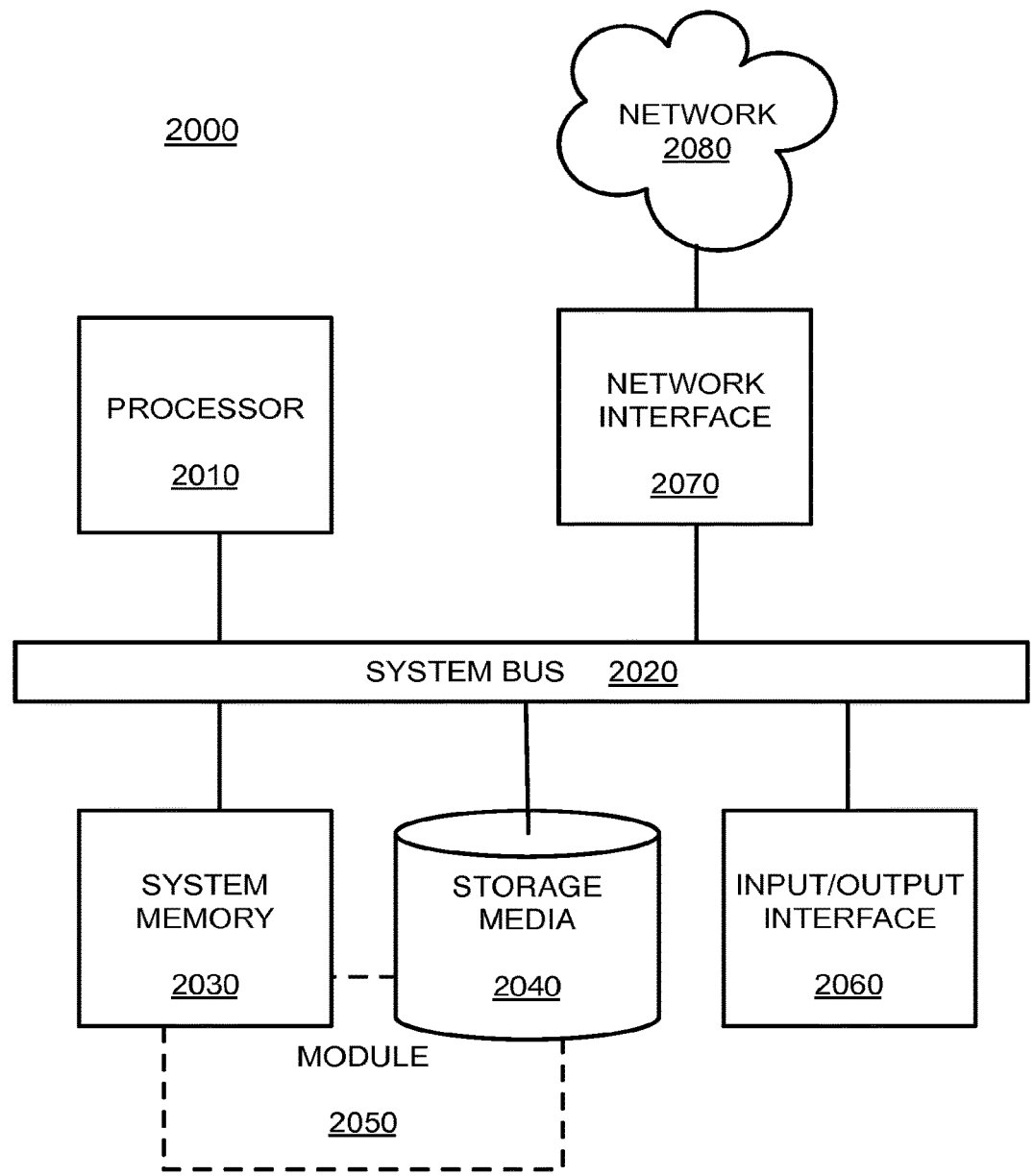
FIG. 4 is a block diagram depicting a computing machine and a module, in accordance with certain example embodiments.

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The T/0 interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions claimed herein.

Although specific embodiments have been described above in detail, the description is merely for purposes of illustration. It should be appreciated, therefore, that many aspects described above are not intended as required or essential elements unless explicitly stated otherwise. Modifications of and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer program product, comprising:
a non-transitory computer-readable storage device having computer-executable program instructions embodied thereon that when executed by a computer cause the computer to deliver server-controlled point of interest alerts to user computing devices when user computing devices approach points of interest based on server-provided point of interest zones, the computer-executable program instructions comprising:
computer-executable program instructions to receive initial user account configuration data from a user computing device;
computer-executable program instructions to configure a database of points of interest for the user account and one or more offers associated with one or more of the points of interest;
computer-executable program instructions to receive location data from a user computing device associated with the user account;
computer-executable program instructions to identify points of interest from the database that are proximate to the user computing device based on the location data and the one or more offers associated with the points of interest;
computer-executable program instructions to determine a boundary of a point of interest zone based at least in part on the location data associated with the user computing device;
computer-executable program instructions to identify a plurality of points of interest in the point of interest zone;
computer-executable program instructions to transmit point of interest data to the user computing device, the point of interest data comprising at least a portion of a point of interest identity, a point of interest location, and point of interest marketing data for each of the plurality of points of interest in the a point of interest zone; and
computer-executable program instructions to transmit instructions to the user computing device to display a particular point of interest at such time as the user computing device enters within a configured range of the particular point of interest.

2. The computer program product of claim 1, wherein the point of interest data for the particular point of interest comprises an alert format, the alert format being determined by a configured alert procedure, the alert procedure specifying the alert format based at least in part on the number of instances that the particular point of interest has been identified in a configured period of time.

3. The computer program product of claim 2, wherein the alert procedure resets to the beginning of the alert procedure if a configured period of time has elapsed since the alert procedure began.

4. The computer program product of claim 2, wherein an alert associated with the alert format comprises one or more of a visual notification, an audible alert, or tactile alert.

5. The computer program product of claim 2, wherein the intensity of an alert associated with the alert format reduces with each subsequent usage of the alert procedure.

6. The computer program product of claim 2, wherein the alert procedure is managed by the user computing device.

7. A system to receive server-controlled point of interest alerts on user computing devices, comprising:
a user computing device associated with a user account comprising a processor and a point of interest alert application executed by the processor; and
a point of interest location computing system comprising a processor and a point of interest location system application executing therein;
the point of interest alert application configured to:
communicate a request for point of interest data corresponding to points of interest within a proximity of the user computing device, the request comprising location data associated with the user computing device;
receive the point of interest data from the point of interest location computing system, the point of interest data comprising at least a portion of a point of interest identity, a point of interest location, and point of interest marketing data for each of a plurality of points of interest in a point of interest zone defined by the point of interest location system, wherein the point of interest zone is determined based at least in part on the location data associated with the user computing device;
identify a particular point of interest at such time as the user computing device enters within a configured range of the particular point of interest;
output an alert regarding the particular point of interest, wherein the alert comprises point of interest data for the particular point of interest, and
the point of interest location system application configured to:
receive location data from the user computing device associated with the user account;
identify points of interest in the database that are proximate to the user computing device based on the location data and one or more offers associated with the points of interest;
determine a boundary of a point of interest zone based at least in part on the location data associated with the user computing device;
identify a plurality of points of interest in the point of interest zone;
transmit the point of interest data to the user computing device, the point of interest data comprising at least a portion of a point of interest identity, a point of interest location, and point of interest marketing data for each of a plurality of points of interest in the point of interest zone; and transmit instructions to the user computing device to display a particular point of interest at such time as the user computing device enters within a configured range of the particular point of interest.

8. The system of claim 7, wherein the point of interest data for the particular point of interest comprises an alert format, the alert format being determined by a configured alert procedure, the alert procedure specifying the alert format based at least in part on the number of instances that the particular point of interest has been identified in a configured period of time.

9. The system claim 8, wherein the alert format procedure resets to the beginning of the alert procedure if a configured period of time has elapsed since the alert procedure began.

10. The system claim 8, wherein the alert format comprises one or more of a visual notification, an audible alert, or tactile alert.

11. The system claim 8, wherein the intensity of an alert associated with the alert format reduces with each subsequent usage of the alert procedure.

12. The system claim 8, wherein the alert procedure is managed by the user computing device.

13. The system claim 7, the point of interest alert application further configured to:
   determine whether a specified period of time has passed since the user computing device received the point of interest data;
   request transmission of updated point of interest data in response to a determination that the specified period of time has passed since the user computing device received the point of interest data, the point of interest data comprising a second point of interest zone;
   receive updated point of interest data, the updated point of interest data comprising at least a portion of a point of interest identity, a point of interest location, and point of interest marketing data for each of a plurality of points of interest in the second point of interest zone;
   identify a second particular point of interest at such time as the user computing device enters within a configured range of the second particular point of interest;
   output an alert regarding the second particular point of interest, wherein the alert comprises point of interest data for the second particular point of interest.

14. A computer-implemented method to deliver server-controlled point of interest alerts to user computing devices, comprising:
   receiving, using one or more computing devices, initial user account configuration data from a user computing device;
   configuring, using the one or more computing devices, a database of points of interest for the user account and one or more offers associated with one or more of the points of interest;
   receiving, using the one or more computing devices, location data from a user computing device associated with the user account;
   identifying, using the one or more computing devices, points of interest in the database proximate to the user computing device based on the location data and the one or more offers associated with the points of interest;
   determining, using the one or more computing devices, a boundary of a point of interest zone based at least in part on the location data associated with the user computing device;
   identifying, using the one or more computing devices, a plurality of points of interest in the point of interest zone;
   transmitting, using the one or more computing devices, point of interest data to the user computing device, the point of interest data comprising at least a portion of a point of interest identity, a point of interest location, and point of interest marketing data for each of the plurality of points of interest in the point of interest zone;
   transmitting, using the one or more computing devices, instructions to the user computing device to display a particular point of interest at such time as the user computing device enters within a configured range of the particular point of interest.

15. The computer-implemented method of claim 14, wherein the point of interest data for the particular point of interest comprises an alert format, the alert format being determined by a configured alert procedure, the alert procedure specifying the alert format based at least in part on the number of instances that the particular point of interest has been identified in a configured period of time.

16. The computer-implemented method of claim 15, wherein the alert procedure resets to the beginning of the alert procedure if a configured period of time has elapsed since the alert procedure began.

17. The computer-implemented method of claim 15, wherein an alert associated with the alert format comprises one or more of a visual notification, an audible alert, or tactile alert.

18. The computer-implemented method of claim 15, wherein the intensity of an alert associated with the alert format reduces with each subsequent usage of the alert procedure.

19. The computer-implemented method of claim 15, wherein the alert procedure is managed by the user computing device.

20. The system of claim 7, wherein the alert is provided by the user computing device in a manner based at least in part on an alert format received from the point of interest location computing system.

21. The system of claim 7, the point of interest alert application further configured to:
   receive initial user account configuration from the user computing device; and
   establish a database of points of interest for the user account and one or more offers associated with one or more of the points of interest.

* * * * *